(12) United States Patent
Schimmler et al.

(10) Patent No.: US 7,481,398 B2
(45) Date of Patent: Jan. 27, 2009

(54) INTERCOSTAL FOR AIRCRAFT

(75) Inventors: Marc Schimmler, Heinbockel (DE); Thomas Grauerholz, Hamburg (DE); Alastair Tucker, Berkshire (GB); Lars Krog, Bristol (GB)

(73) Assignee: Airbus Deutschland GmbH (DE)

( * ) Notice: Subject to any disclaimer, the term of this patent is extended or adjusted under 35 U.S.C. 154(b) by 638 days.

(21) Appl. No.: 11/064,661

(22) Filed: Feb. 24, 2005

(65) Prior Publication Data

US 2006/0261215 A1  Nov. 23, 2006

Related U.S. Application Data

(60) Provisional application No. 60/598,254, filed on Aug. 3, 2004.

(30) Foreign Application Priority Data

Feb. 25, 2004  (DE) .................. 10 2004 009 020

(51) Int. Cl.
*B64C 1/00* (2006.01)

(52) U.S. Cl. ............... 244/119; 244/123.1; 244/123.14; 244/123.4

(58) Field of Classification Search ............. 244/117 R, 244/119, 123.1, 123.14, 123.4
See application file for complete search history.

(56) References Cited

U.S. PATENT DOCUMENTS

| | | | |
|---|---|---|---|
| 2,210,163 A | | 8/1940 | Boyd |
| 2,389,767 A | * | 11/1945 | Dalton ................ 52/506.06 |
| 4,481,703 A | * | 11/1984 | Scott ................... 29/525.06 |
| 6,786,452 B2 | * | 9/2004 | Yamashita et al. ...... 244/123.1 |
| 7,159,822 B2 | * | 1/2007 | Grantham et al. .......... 244/119 |

FOREIGN PATENT DOCUMENTS

| | | |
|---|---|---|
| DE | PS 403836 | 10/1924 |
| DE | PS 411259 | 3/1925 |
| DE | AS 1 121 477 | 1/1962 |

* cited by examiner

*Primary Examiner*—J. Woodrow Eldred
(74) *Attorney, Agent, or Firm*—Lerner, David, Littenberg, Krumholz & Mentlik, LLP

(57) ABSTRACT

An intercostal for an aircraft for dissipating a load from a first frame onto a second frame and/or a skin of the aircraft, the intercostal having a framework.

19 Claims, 2 Drawing Sheets

INTERCOSTAL FOR AIRCRAFT

CROSS-REFERENCE TO RELATED APPLICATIONS

This application claims the benefit of the filing date of U.S. Provisional Patent Application No. 60/598,254 filed Aug. 3, 2004, the disclosure of which is hereby incorporated herein by reference.

BACKGROUND OF THE INVENTION

The present invention relates to support structures in aircraft. The present invention particularly relates to an intercostal to be attached between frames of an aircraft structure.

In door cutout regions in the fuselage of aircraft, for example, intercostals or ribs are used in order to transmit moments from system fittings of a frame onto a neighboring frame and/or the aircraft skin, for example. An intercostal typically comprises rectangular milled recesses, two ribs, which couple an external belt and an internal belt of the intercostal, and a hole, whose edge is reinforced, between the external belt and the internal belt, which is used for the passage of system lines, such as power lines. Due to multiple reinforcement ribs and due to continuous thrust panels, i.e., due to the provision of a low number of openings in the region between the external belt and the internal belt, such an embodiment has a large weight. Since the openings are dimensioned relatively small, it is necessary to dimension system lines correspondingly small in order to guide the corresponding lines through these openings. Furthermore, the small dimensioning of the openings often requires redirection of the system lines.

SUMMARY OF THE INVENTION

According to one exemplary embodiment of the present invention, an intercostal for an aircraft is provided. The intercostal is for dissipating a load from a first frame onto a second frame and/or a skin of the aircraft. The intercostal has a framework structure.

This exemplary embodiment according to the present invention advantageously has a low weight. In particular, the intercostal according to this exemplary embodiment of the present invention has a significantly reduced weight in comparison to an intercostal that has a nearly continuous thrust field or panel, i.e., a thrust panel in which only an opening is provided for the system lines. By providing the framework in the intercostal structure, a rigidity (in the load direction) which is comparable to intercostals having essentially continuous thrust panels is essentially achieved. However, less material is necessary because the framework is provided, due to which the intercostal becomes lighter. Through the possibility of replacing an essential part of the thrust panel by the framework, a significantly larger space is now available for system lines, through which system lines that are dimensioned larger may be passed through the intercostal or laid inside it, due to which they become shorter and therefore lighter. Internal paneling of the aircraft structure may thus advantageously become smaller and therefore lighter.

According to a further exemplary embodiment of the present invention, the intercostal has a frame region to be attached to the neighboring frames (former) or the skin. The framework is provided in the frame region, i.e., the frame region encloses the framework.

This allows replacement of the typical intercostals by an intercostal according to this exemplary embodiment in already existing structures, since this intercostal may have essentially identical attachment dimensions as the conventional intercostals due to the frame region.

According to a further exemplary embodiment of the present invention, the intercostal has an internal belt and an external belt. If the intercostal is positioned between two frames, an external contour of the external belt essentially follows the inside of the skin of the aircraft, so that the skin of the aircraft is supported. The internal belt, which is provided on the side of the intercostal facing inward if the intercostal is positioned between the frames of the aircraft, couples the two frames. In this case, coupling is to be understood as a direct connection between the two frames.

According to a further exemplary embodiment of the present invention, the framework has at least one rod, which may be implemented as a tension rod or compression rod. By arranging the rod between the internal belt and the external belt like a framework strut, a bending moment which is exerted on one of the two frames may be distributed in such a way that a part of the force resulting from the bending moment is conducted along the internal belt (e.g., onto the next frame) and another part of the force resulting from the bending moment is transmitted onto the external skin.

This may allow dissipation or diverting of the bending moment onto surrounding structures, whereby a greater rigidity may be achieved overall.

According to a further exemplary embodiment of the present invention, the intercostal has flanges for connection to the frames. A thrust panel is provided between the flanges and between the external belt and the internal belt for transferring a bolt load from the flanges into the framework when the intercostal is attached to the frames using bolts or rivets.

It is believed that this allows simple and uniform dissipation of forces onto the framework.

According to a further exemplary embodiment of the present invention, the external belt is tailored to be mounted essentially pressed along the external skin of the aircraft, through which the external skin is supported. Through a support of the external skin of this type it is possible, for example, to use a material for the external skin which has a lower material thickness, through which a weight of the aircraft may be reduced in turn.

According to a further exemplary embodiment of the present invention, through interaction with the external skin, the internal skin, and the flanges, the framework allows coupling of the two frames and dissipation of a load from the first frame onto the second frame and the external skin of the aircraft. In this way, a self-supporting structure is achieved, which has a low weight.

According to a further exemplary embodiment of the present invention, at least one opening is provided in the framework region, which has dimensions for guiding through at least one system line. This may be advantageously achieved inherently by the framework structure and/or rod or supporting framework structure, since multiple system lines, such as power lines, may be laid through the intermediate spaces between the individual rods without problems.

According to a further exemplary embodiment of the present invention, the frame region has bores or holes for receiving rivets or bolts. The intercostal may thus advantageously be attached to the frames in the same way as conventional intercostals. According to a variation of this exemplary embodiment, the frame region is implemented to be glued to the frames and/or the external skin of the aircraft.

A further exemplary embodiment of the invention relates to an aircraft having an intercostal according to an exemplary embodiment of the present invention.

In the following, exemplary embodiments of the present invention are described with reference to the attached figures.

DETAILED DESCRIPTION

In the following description of FIG. 1 through 5, identical reference numbers are used for identical or corresponding elements. The term intercostal ["wischenkostal"] means the same thing as intercostal or Interkostal, as is also used in German, but preferably in English.

Figure 1:
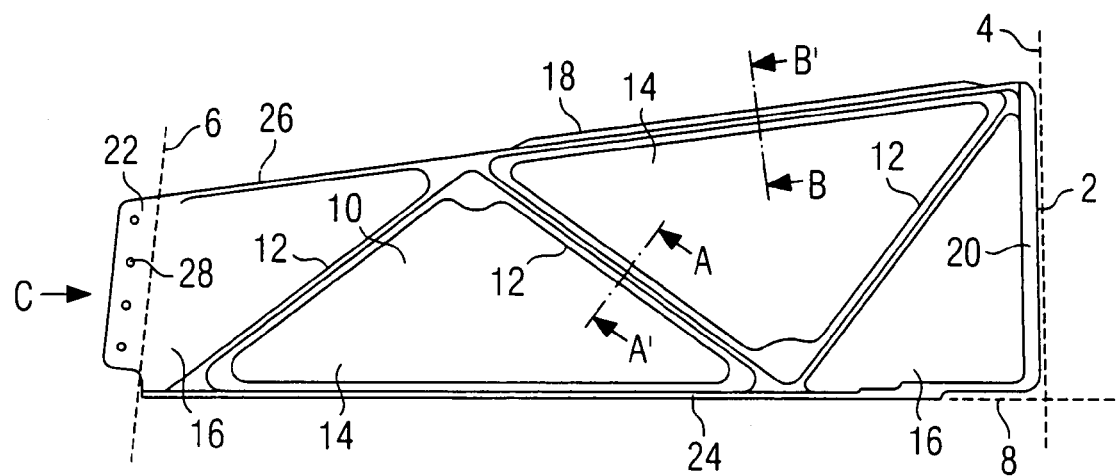
FIG. 1 shows a side view of an exemplary embodiment of an intercostal for an aircraft according to the present invention.

FIG. 1 shows a side view of an exemplary embodiment of an intercostal 2 for an aircraft according to the present invention. The intercostal 2, which is shown in FIG. 1, is arranged to dissipate a load from first frame (former) 4 onto a second frame 6 and/or onto a skin (e.g., external skin) 8 of the aircraft. The intercostal 2 has a framework 10. The intercostal 2 has a first flange 20 and a second flange 22. Using the first and the second flanges 20 and 22, the intercostal 2 is connected using gluing or riveting to the frames 6 and 4, which are illustrated in FIG. 1 using dashed lines. This connection is advantageously designed so that forces may be transmitted from the frames 4 and 6 onto the flanges 20 and 22 and therefore onto the intercostal 2.

The intercostal shown in FIG. 1 is provided in a door or door cutout region, for example, particularly to transmit moments from hardware fittings of a frame onto a neighboring frame and the skin 8 of the aircraft, for example. The framework has at least one rod 12. The framework 10 shown in FIG. 1 has three rods 12. The arrangement of the rods 12 to form a framework and/or the angle at which the rods 12 are to be positioned in relation to one another in order to implement a framework 10 for transmitting specific forces or moments is known to those skilled in the art, because of which it will not be discussed in greater detail here.

Intermediate spaces 14 are provided between the rods 12 of the framework 10. As may be inferred from FIG. 1, two triangular intermediate spaces 14 are provided in the framework 10 illustrated in FIG. 1, which are particularly suitable for the passage of system lines, such as electrical lines. The intermediate spaces 14 have significantly larger dimensions than known intercostals, whereby a larger number of system lines may be laid in the intermediate spaces 14 in the most flexible way. Because of the fact that a larger number of system lines may be laid in the intermediate spaces 14, paneling which lines the supporting framework structure of the aircraft on the inside may be applied more closely to the supporting structures of the aircraft fuselage, for example, since further intermediate spaces for cable passages do not have to be provided, as is currently typical. Furthermore, flexible laying of system lines is also possible as retrofitting.

In order to transmit forces from the frames 4 and 6 via the flanges 20 and 22 onto the framework 10, thrust panels 16 are provided, which apply forces that are applied to the flanges 20 and 22 onto the framework 10 and therefore onto the rods 12. As may be inferred from FIG. 1, the thrust panels 16 are implemented using planar regions which may be milled, forged, or even cast into the material of the intercostal 2, for example.

The external contours of the intercostal 2 are determined by the flanges 20 and 22 and an internal belt 26 and an external belt 24 that implement a frame region of the intercostal 2. When the intercostal 2 is mounted between the frames 4 and 6 in the supporting framework structure of the aircraft, the internal belt 26 points toward the interior of the aircraft. The external belt 24 is implemented to be positioned essentially pressed against the skin 8 of aircraft, i.e., it is essentially tailored to a shape of the external skin 8 of the aircraft. By attaching the external belt 24 to the inside of the external skin 8 of the aircraft, the skin structure of the aircraft may be reinforced, for example.

The flanges 20 and 22, the external belt 24, and the internal belt 26 essentially form a trapezoid in the exemplary embodiment shown in FIG. 1, which encloses the framework 10 having the intermediate spaces 14 and the rods 12 as well as the thrust panels 16.

According to one exemplary embodiment, as shown in FIG. 1, a reinforcement rib 18 may be provided on a region of the internal belt 26, which may be used to reinforce the structure of the intercostal 2, for example, and also to attach internal paneling of the aircraft, for example.

At least one hole (bore) 28 may be provided on the frame region of the intercostal 2, as shown here at flange 22, for example, for attaching the intercostal 2 to the frame 6 using bolts or rivets.

Material regions, which provide a space for attaching or binding system supports, for example, may be provided toward the openings in connection points of the ribs 12, as may be inferred from FIG. 1.

The girder structure shown in FIG. 1, i.e., the intercostal, is advantageously very safe and reliable. If, for example, the internal belt 26 fails in the region of the reinforcement 18, a residual supporting framework, comprising the flange 20, the rod 12, a region of the external belt 24, and a region of the thrust panel 16, which may at least partially assume the support function, still remains standing. This also applies for the other side of the costal, of course. In addition, for example, cracks arising through material fatigue due to overload in the thrust panel 16, for example, are extremely slowed by the ribs and rods and/or by the structures of the framework.

Figure 2:
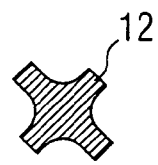
FIG. 2 shows a sectional view along the line AA' in FIG. 1.

FIG. 2 shows a sectional view through the rod 12 along the section line AA' in FIG. 1. As may be inferred from FIG. 2, the rod 12 has an essentially cross-shaped cross-section, angles near the intersection point of the bars being rounded.

Figure 3:
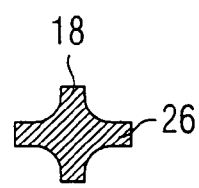
FIG. 3 shows a further sectional view along the line BB' in FIG. 1.

FIG. 3 shows a further sectional view through the internal belt 26 along the section line BB' in FIG. 1. As may be inferred from FIG. 3, the internal belt 26, together with the stiffening rib 18, also has an essentially cross-shaped cross-section having rounded angles.

It may be inferred from FIGS. 1, 2, and 3 that the framework 10 according to this exemplary embodiment comprises the rods 12 (three rods 12 here) and regions of the internal belt 26 and the external belt 24. The rods 12 each form an essentially equilateral triangle with a corresponding region of the internal belt 26 and the external belt 24. The triangle standing at the head in FIG. 1, comprising the rods 12 and the region of the internal belt 26 that is provided with the reinforcement rib 18, has a somewhat greater leg length than the second triangle, which is formed by two rods 12 and a region of the external belt 24. The area of the two triangles is an opening, i.e., intermediate space 14, in each case. A thrust panel 16 adjoins one leg in each case, i.e., one rod 12 of each triangle, to transmit the forces onto the framework 10.

An intercostal 2 according to this exemplary embodiment may be manufactured using various milling procedures and/or using a forging or casting method, for example.

Figure 4:
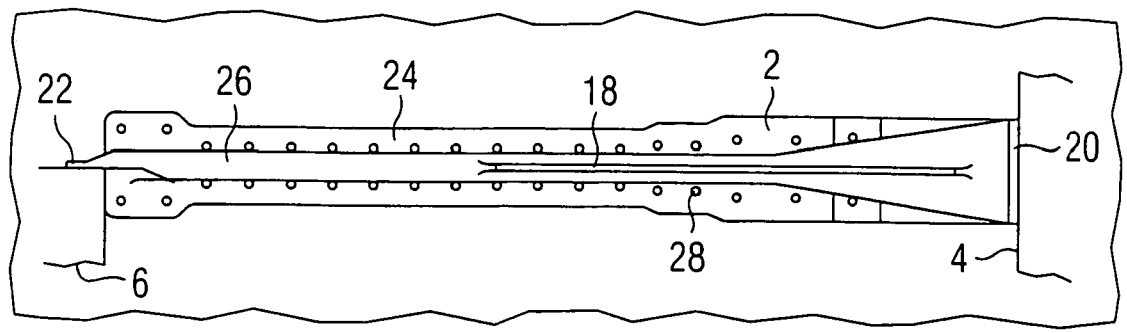
FIG. 4 shows a top view of the intercostal from FIG. 1.

FIG. 4 shows a top view of the internal belt 26 of the intercostal 2 from FIG. 1. As may be inferred from FIG. 4, the reinforcement rib 18 only extends over a region of the internal belt 26. It may also be inferred from FIG. 4 that holes 28 may be provided in the external belt 24, for riveting or bolting the intercostal 2 to the external skin 8 of the aircraft, for example.

Figure 5:
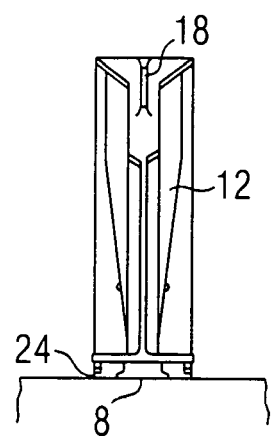
FIG. 5 shows a view of the intercostal from FIG. 1 along a view direction as indicated by arrow C in FIG. 1.

FIG. 5 shows a rear view of the intercostal 2 from FIG. 1, the rear view showing a viewing angle along arrow C of FIG. 1.

As may be inferred from FIG. 5, the external belt 24 may have a planar region to be attached to the external skin 8 of the aircraft. The rods 12 may be implemented in such a way that they taper toward the flange 22, for example. The rods 12 may also be implemented so that they taper toward the external skin 8, i.e., toward the external belt 24.

According to one exemplary embodiment of the present invention, instead of using ribs and a continuous thrust panel for an intercostal, using a framework for an intercostal is suggested. According to one exemplary embodiment, the intercostal is constructed using a framework, significantly reduced thrust panels being provided in order to transmit forces from the flanges, which are implemented to be attached to the frames, onto the framework. In this way, a size of the thrust panels is minimized. In addition, an area of openings in the intercostal may be enlarged, through which a large number of system lines may be laid easily and flexibly. Paneling of the supporting framework structure of the aircraft may thus be implemented lighter and the lines may be shortened, for example.

In addition, by using a framework as the intercostal and/or by implementing the intercostal using the framework, significantly less material is necessary with rigidity that remains the same in comparison to an intercostal having essentially continuous thrust panels, which means that the intercostal becomes significantly lighter. The same rigidity is essentially achieved along the main load direction of the intercostal in this case. Because a large part of the thrust panel may be dispensed with, a significantly larger space is now available for system lines, through which the paneling of the structure may also become smaller and therefore lighter.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. An intercostal for an aircraft for dissipating a load from a first frame onto one or both of a second frame and a skin of the aircraft, the intercostal comprising:
   a framework and a frame region;
   wherein the frame region has a first flange, a second flange, an internal belt, and an external belt;
   wherein the frame region is arranged to be attached to the first frame, the second frame, or the skin;
   wherein the frame region encloses a framework region and wherein the framework is provided in the frame region;
   wherein the first flange is provided for attachment to the first frame;
   wherein the second flange is provided for attachment to the second frame; and
   wherein a thrust panel, for transmitting a load onto the framework, is provided between at least one of the first and second flanges and at least one of the external belt and the internal belt.

2. The intercostal as claimed in claim 1,
   wherein the internal belt points toward an inner side of a fuselage of the aircraft if positioned between the first and second frame;
   wherein the external belt is positioned neighboring the skin of the aircraft if positioned between the first and the second frame; and
   wherein the internal belt and external belt are adapted to couple the first frame and the second frame if the intercostal is positioned between the first frame and the second frame.

3. The intercostal as claimed in claim 2,
   wherein the framework has at least one rod which is positioned between the internal belt and the external belt;
   wherein the at least one rod is positioned between the internal belt and external belt in such a manner that a bending moment which is applied to at least one of the first and second frames is distributed in such a manner that a first part of the force resulting from the bending moment is conducted along the internal belt and a second part of the force resulting from the bending moment is transmitted onto the skin, if the rod is positioned between the first and the second frame neighboring the skin.

4. The intercostal as claimed in claim 3,
   wherein the at least one rod is arranged such that a triangular geometry is formed by the framework.

5. The intercostal as claimed in claim 2,
   wherein the external belt is tailored to be mounted essentially pressed along the external skin of the aircraft, a support of the external skin being made possible.

6. The intercostal as claimed in claim 1,
   wherein at least one opening, which has dimensions for passage of a system line, is provided in the framework region.

7. The intercostal as claimed in claim 1,
   wherein holes are provided in the frame region for receiving rivets.

8. The intercostal as claimed in claim 1,
   wherein the framework is implemented such that a load on the first frame is dissipated onto the second frame and the external skin of the aircraft, the first and the second frames being coupled.

9. An aircraft comprising:
   an intercostal for dissipating a load from a first frame onto one or both of a second frame and skin of the aircraft, wherein the intercostal comprises a framework and a frame region;
   wherein the frame region has a first flange, a second flange, an internal belt, and an external belt;
   wherein the frame region is arranged to be attached to the first frame, the second frame, or the skin;
   wherein the frame region encloses a framework region and wherein the framework is provided in the frame region;
   wherein the first flange is provided for attachment to the first frame;
   wherein the second flange is provided for attachment to the second frame; and
   wherein a thrust panel, for transmitting a load onto the framework, is provided between at least one of the first and second flanges and at least one of the external belt and the internal belt.

10. An intercostal for dissipating a load from a first frame onto one or both of a second frame and a skin of an aircraft, the intercostal comprising:
- a framework formed from an internal belt, a first flange, an external belt, and a second flange;
- a first rod spanning from a first portion of the framework to a second portion of the framework to separate the framework into a first intermediate space and a second intermediate space;
- a thrust panel substantially filling said first intermediate space;
- wherein the first flange is matable to the first frame, the second flange is matable the second frame, and the external belt is matable to the skin of the aircraft.

11. The intercostal of claim 10, wherein the first portion of the framework is located along the internal belt and the second portion of the framework is located along the external belt.

12. The intercostal of claim 10, wherein the first portion of the framework is located along the external belt and the second portion of the framework is located at the intersection of the internal belt and the first flange.

13. The intercostal of claim 10, further comprising a second rod spanning from a third portion of the framework to a fourth portion of the framework to separate the framework into the first intermediate space, second intermediate space, and a third intermediate space.

14. The intercostal of claim 13, wherein the first portion of the framework and the third portion of the framework are the same location.

15. The intercostal of claim 13, further comprising a third rod spanning from a fifth portion of the framework to a sixth portion of the framework to separate the framework into the first intermediate space, second intermediate space, third intermediate space, and a fourth intermediate space.

16. The intercostal of claim 15, further comprising a thrust panel filling said fourth intermediate space.

17. The intercostal of claim 15, wherein the fourth portion of the framework and the fifth portion of the framework are the same location.

18. The intercostal of claim 10, further comprising a reinforcement rib associated with said internal belt.

19. The intercostal of claim 10, wherein the first rod is arranged such that a triangular geometry is created between the first rod, the internal belt, and the first flange.

* * * * *

UNITED STATES PATENT AND TRADEMARK OFFICE
CERTIFICATE OF CORRECTION

PATENT NO. : 7,481,398 B2
APPLICATION NO. : 11/064661
DATED : January 27, 2009
INVENTOR(S) : Marc Schimmler et al.

It is certified that error appears in the above-identified patent and that said Letters Patent is hereby corrected as shown below:

Col. 1, line 9, after "by reference" insert --and also claims the benefit of the filing date of German Application DE 10 2004 009.020.3 with a filing date of February 25, 2004--.

Signed and Sealed this

Sixth Day of April, 2010

David J. Kappos
*Director of the United States Patent and Trademark Office*